(12) United States Patent
Ebuchi

(10) Patent No.: US 7,916,325 B2
(45) Date of Patent: Mar. 29, 2011

(54) PRINTING SYSTEM WITH TRAY SELECTION SUBSTITUTION

(75) Inventor: Kazuhisa Ebuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1121 days.

(21) Appl. No.: 11/155,624

(22) Filed: Jun. 20, 2005

(65) Prior Publication Data

US 2006/0002752 A1 Jan. 5, 2006

(30) Foreign Application Priority Data

Jun. 30, 2004 (JP) .................. 2004-194288

(51) Int. Cl.
*G06F 3/12* (2006.01)
*G06K 15/00* (2006.01)
*G03G 15/00* (2006.01)

(52) U.S. Cl. ............... 358/1.15; 358/1.16; 358/1.18; 399/391

(58) Field of Classification Search .......... 358/1.14, 358/1.9, 1.15, 1.2, 1.6, 1.12, 1.16, 1.18; 399/9, 399/11, 23, 24, 38, 81, 367, 8, 16, 369, 391, 399/82; 710/6, 8, 15, 19, 46; 355/408
See application file for complete search history.

(56) References Cited

U.S. PATENT DOCUMENTS

| | | | |
|---|---|---|---|
| 5,061,958 A * | 10/1991 | Bunker et al. | 399/81 |
| 5,555,014 A | 9/1996 | Matsukawa | 347/262 |
| 6,285,844 B1 | 9/2001 | Kuga | 399/85 |
| 6,302,389 B1 | 10/2001 | Kato et al. | 270/58.13 |
| 6,526,253 B2 * | 2/2003 | Hayashi et al. | 399/391 |
| 6,606,466 B2 * | 8/2003 | Sato | 399/82 |
| 6,850,337 B1 * | 2/2005 | Anderson et al. | 358/1.15 |

(Continued)

FOREIGN PATENT DOCUMENTS

JP 6-297797 10/1994

(Continued)

OTHER PUBLICATIONS

Notification of First Office Action, issued by The State Intellectual Property Office of P.R. China, in Chinese Patent Application No. 2005100801458, on August 3, 2007 (w/English translation).

(Continued)

*Primary Examiner* — Dov Popvici
*Assistant Examiner* — Thomas J Lett
(74) *Attorney, Agent, or Firm* — Fitzpatrick, Cella, Harper & Scinto

(57) ABSTRACT

This invention provides appropriate information of the next action or operation to be taken by the user on the basis of the property of a print job and status sent from a printer when paper-out information is sent from the printer while the print job is output to the printer having a plurality of paper supplying ports. To this end, it is monitored whether or not a paper-out message is received during output of a print job to the printer having the plurality of paper supplying ports. If a paper-out state has occurred, when the user has explicitly designated one paper supplying port, it is determined that the paper supplying port cannot be switched, and information that prompts the user to re-set paper sheets is displayed. On the other hand, when the user has not explicitly designated any paper supplying port, information indicating that another paper supplying port is selectable is displayed.

9 Claims, 18 Drawing Sheets

U.S. PATENT DOCUMENTS

| | | | |
|---|---|---|---|
| 7,355,733 B2 * | 4/2008 | Sommer et al. | 358/1.15 |
| 2003/0025937 A1 * | 2/2003 | Christodoulou et al. | 358/1.15 |
| 2005/0185993 A1 * | 8/2005 | Kobayashi | 399/309 |
| 2006/0002752 A1 | 1/2006 | Ebuchi | 400/76 |

FOREIGN PATENT DOCUMENTS

| | | |
|---|---|---|
| JP | 8-118753 | 5/1996 |
| JP | 2000-62292 A | 2/2000 |
| JP | 2001-228754 | 8/2001 |
| JP | 2001-331289 | 11/2001 |
| JP | 2001-331299 | 11/2001 |
| JP | 2003-263297 | 9/2003 |

OTHER PUBLICATIONS

Office Action issued by the Japanese Patent Office on Sep. 21, 2007.

* cited by examiner

FIG. 5

| PAPER SUPPLYING CASSETTE (UPPER) | UNSWITCHABLE | 0 |
| --- | --- | --- |
| PAPER SUPPLYING CASSETTE (LOWER) | UNSWITCHABLE | 0 |
| STRAIGHT PAPER SUPPLYING PORT | UNSWITCHABLE | 1 |
| MANUAL PAPER SUPPLYING PORT | UNSWITCHABLE | 0 |
| AUTO | SWITCHABLE | 0 |

PAPER-OUT ERROR

NO PAPER IS AVAILABLE ON STRAIGHT PAPER SUPPLYING PORT. PLEASE SET PAPER.

PAPER-OUT ERROR

NO PAPER IS AVAILABLE IN UPPER PAPER SUPPLYING CASSETTE.
PLEASE CLICK ANOTHER PAPER SUPPLYING PORT OR SET PAPER IN UPPER PAPER SUPPLYING CASSETTE.

FIG. 8

| PAPER TYPE | AVAILABLE PAPER SUPPLYING PORT | FLAG |
|---|---|---|
| PLAIN PAPER | PAPER SUPPLYING PORT A, B, C | 1 |
| HIGH-GRADE PHOTO PAPER | PAPER SUPPLYING PORT A, B | 0 |
| STANDARD-SIZE POSTCARD | PAPER SUPPLYING PORT A | 0 |
| ... | ... | ... |

FIG. 10

| PAPER SIZE | AVAILABLE PAPER SUPPLYING PORT | FLAG |
|---|---|---|
| A3 | PAPER SUPPLYING PORT A, B, C | 0 |
| A4 | PAPER SUPPLYING PORT A, B, C | 1 |
| STANDARD-SIZE POSTCARD | PAPER SUPPLYING PORT A, B | 0 |
| NAME CARD | PAPER SUPPLYING PORT A | 0 |
| ... | ... | ... |

FIG. 15

| HELP OF STATUS MONITOR | | | | |
|---|---|---|---|---|
| FILE(F) EDIT(E) BOOKMARK(M) OPTION(O) HELP(H) | | | | |
| CONTENT(C) | KEYWORD(I) | BACK(R) | PRINT(P) | |

SWITCH PAPER SUPPLYING SOURCE FROM AUTO SHEET FEEDER TO CASSETTE

WHEN NO PAPER IS AVAILABLE IN AUTO SHEET FEEDER DURING PRINTING, IF PAPER OF SAME TYPE IS SET IN CASSETTE, PRINTING CAN BE RESTARTED BY PRESSING PAPER SUPPLYING CHANGEOVER BUTTON.

1. 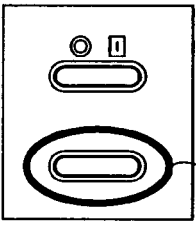 SWITCH PAPER SUPPLYING CHANGEOVER BUTTON OF MAIN BODY TO CASSETTE.
   ~1501

2. 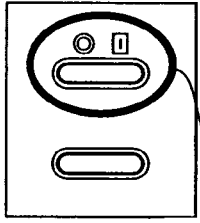 PRESS RESET BUTTON OF MAIN BODY.
   PAPER IS FED FROM CASSETTE, AND REMAINING DATA IS PRINTED.
   ~1502

NOTE:
- WHEN "PAPER SIZE" THAT CANNOT BE SET IN CASSETTE IS USED, DO NOT SWITCH PAPER SUPPLYING SOURCE. IF PAPER SUPPLYING SOURCE IS SWITCHED TO CASSETTE, PRINTING CANNOT BE NORMALLY MADE.

RELATED ITEM
SWITCH PAPER SUPPLYING SOURCE FROM CASSETTE TO AUTO SHEET FEEDER

PRINTING SYSTEM WITH TRAY SELECTION SUBSTITUTION

FIELD OF THE INVENTION

The present invention relates to a technique for forming an image on a print medium such as a print paper sheet or the like.

BACKGROUND OF THE INVENTION

Some printing apparatuses have various paper supplying ports (paper supplying methods) depending on the types of paths along which print paper sheets are fed, and the stock forms of paper sheets. For example, as paper supplying paths, a paper supplying port that uses a J path or straight path as a relatively flat paper feeding path for paper supply and after paper supply, and a complicated paper feeding path after paper supply such as a U-turn path or the like are known. Also, an "automatic paper supplying port" for automatically supplying paper sheets set on a tray one by one, a "manual paper supplying port" for manually supplying a paper sheet to a position near a print head unit by the user, a "cassette paper supplying port" for stocking paper sheets in large quantities in a cassette-like case or the like in advance, and automatically supplying paper sheets from that case, and the like are available.

A paper supplying port which uses a flat path free from any warp of paper sheets is often used when high-resolution photos are printed on high-grade paper sheets or the like. On the other hand, a straight path manual paper supplying port is often used in a thick paper printing apparatus which forms book jackets or the like.

When a printing apparatus having a plurality of paper supplying ports suffers a paper-out state during printing, it is desired to notify the user of not only such paper-out state but also a paper supplying port for which paper sheets are to be set. In order to realize such notification, a technique for prompting the user to set paper sheets at a paper feeding port used until just before when a paper-out state has occurred is known (e.g., Japanese Patent Laid-Open No. 8-118753).

Depending on the print purpose, when a paper-out state has occurred at a given paper supplying port, the user may want to restart printing by switching that paper supplying port to another paper supplying port. On the other hand, when a paper-out state has occurred at a given paper supplying port, the user may also want to restart printing by loading paper sheets at that paper supplying port.

SUMMARY OF THE INVENTION

It is an object of the present invention to provide a technique for providing non-confusable information about an action or operation to be taken by the user when a paper-out state has occurred after issuance of a print job. In order to achieve the above object, an information processing apparatus according to the present invention comprises the following arrangement. That is, there is provided an information processing apparatus which can make bidirectional communications with a printer having a plurality of paper supplying ports, and transmits a print job to the printer, comprising:

monitor means for monitoring the printer by receiving status information from the printer;

determination means for, when status information including information indicating the absence of print media is received after the print job begins to be output to the printer, determining based on types of paper supplying ports of the printer and a property of the print job whether or not the current paper supplying port can be switched to another paper supplying port; and notifying means for notifying a determination result of the determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows an example of an information table in the first embodiment;

FIG. 8 shows an example of an information table in the second embodiment;

FIG. 10 shows an example of an information table in the third embodiment;

FIG. 15 shows an example of a help window to be displayed;

DETAILED DESCRIPTION OF THE PREFERRED EMBODIMENTS

Preferred embodiments according to the present invention will be described in detail hereinafter with reference to the accompanying drawings.

First Embodiment

Figure 1:
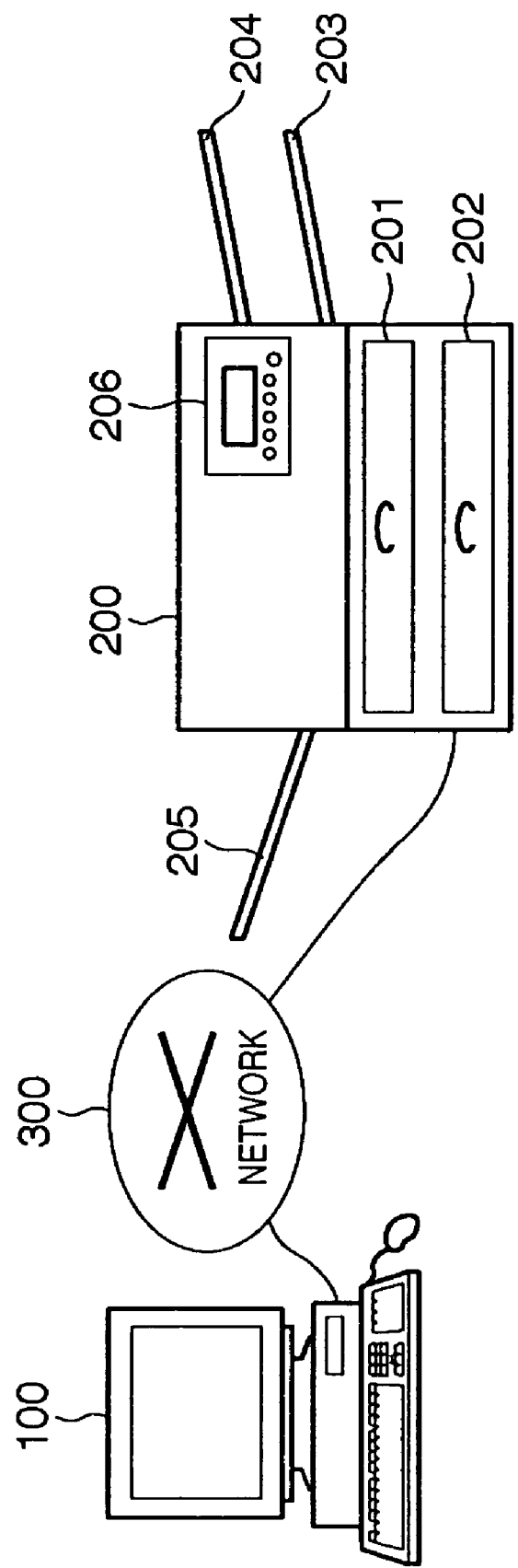
FIG. 1 is a view showing the configuration of a printing system according to an embodiment of the present invention.

FIG. 1 shows the configuration of a printing system in this embodiment. Referring to FIG. 1, reference numeral 100 denotes a general-purpose information processing apparatus such as a personal computer or the like (to be referred to as a PC hereinafter); and 200, a printer. Reference numeral 300 denotes a network. Both the PC 100 and printer 200 are connected to this network 300. Note that other PCs, printers, and various servers may be connected to the network 300 in addition to those which are shown in FIG. 1. However, since this embodiment will be explained focused on the PC 100 and printer 200, other devices are omitted. Also, the PC 100 and printer 200 may be directly connected without the intervention of the network 300. In this case, the PC 100 and printer 200 are connected using a two-way interface such as IEEE1284, USB, or the like.

As shown in FIG. 1, the printer 200 has paper supplying cassettes 201 and 202, a straight paper supplying port 203, and a manual paper supplying port 204 as paper supplying sources, and also has an exhaust tray 205. Plain paper sheets are set in the paper supplying cassettes 201 and 202. A plain paper sheet in each cassette is internally fed to a printer engine via a nearly U-turn path counterclockwise by driving paper supplying rollers arranged in the printer, and is exhausted onto the exhaust tray 205. On the other hand, the straight paper supplying port 203 is provided to the side surface nearly opposite to the exhaust tray 205, and print sheets set on this port are fed to the printer engine and exhaust tray 205 via a straight feeding path. Therefore, this straight paper supplying port 203 is used to set print sheets which must not suffer any warp (high-grade sheets used to print photo images) and thick print sheets. The manual paper supplying port 204 is substantially the same as the straight paper feeding port 203. Note that a control panel 206 (including a liquid crystal display and a plurality of buttons and switches) used to make various settings is provided to the printer 200. Upon operating this control panel, operation settings of the printer can be made. As one of setting contents, upon reception of print data from the network 300, when the print data does not include any designation command that explicitly designates a paper supplying source (one of the four different sources 201 to 204 in this embodiment), a paper supplying source selected as a default is set.

Figure 2:
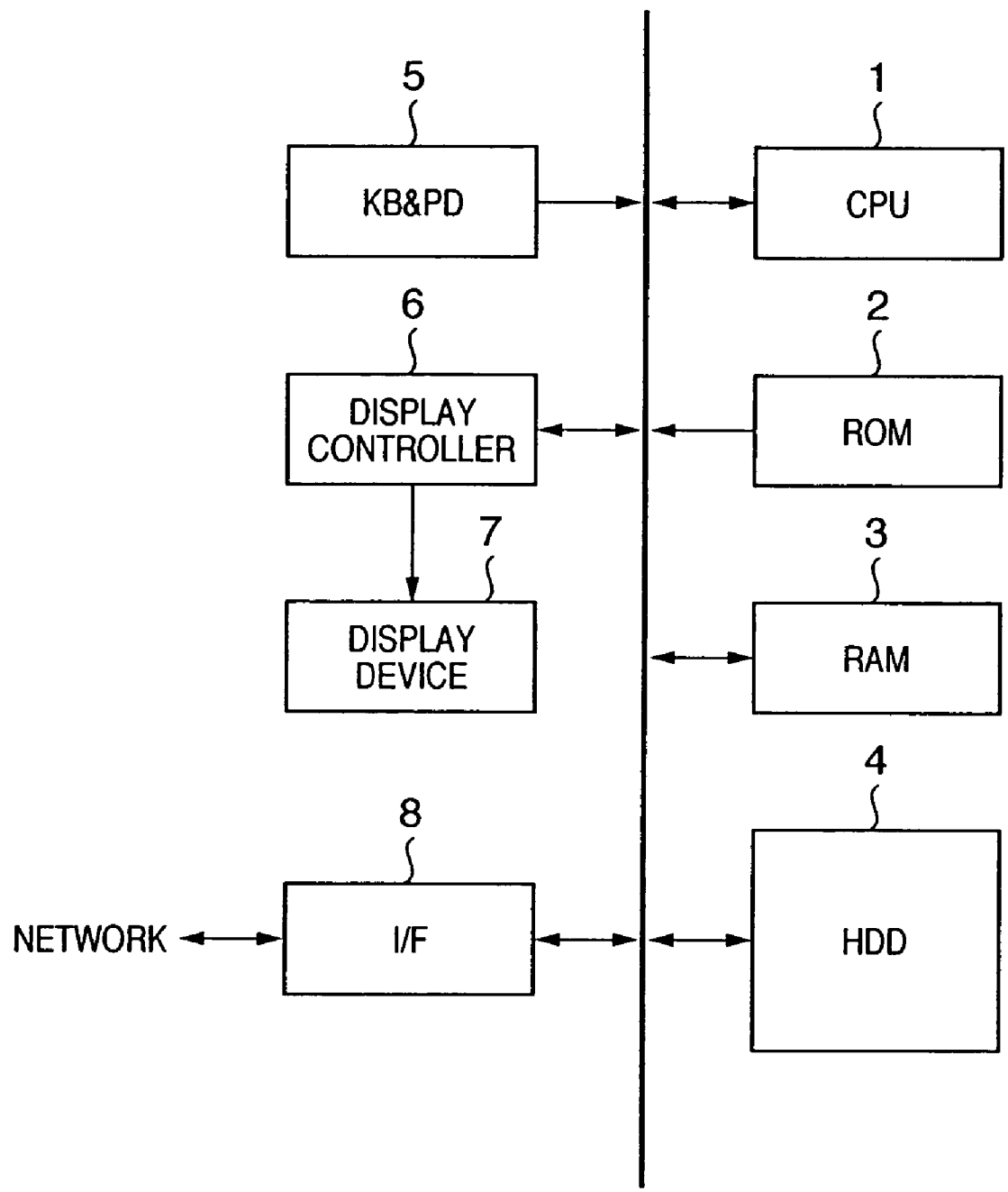
FIG. 2 is a block diagram showing the arrangement of a PC in the embodiment.

FIG. 2 is a block diagram showing the arrangement of the PC 100 in this embodiment.

Referring to FIG. 2, reference numeral 1 denotes a CPU which controls the overall PC. Reference numeral 2 denotes a ROM which stores a BIOS and boot program; and 3, a RAM used as a work area of the CPU 1. Reference numeral 4 denotes a hard disk drive (HDD) which stores an OS (operating system), various application programs, a printer driver program of this embodiment, and various data files. Reference numeral 5 denotes a keyboard and a pointing device such as a mouse(R) or the like (KB & PD). Reference numeral 6 denotes a display controller which comprises a video memory and a controller for executing a rendering process on the video memory under the control of the CPU 1, and outputs an image written in the video memory as a video signal. Reference numeral 7 denotes a display device such as a CRT, liquid crystal display, or the like, which displays an image in accordance with a video signal from the display controller 6. Reference numeral 8 denotes an interface used to connect the network 300.

When the power switch of this PC is turned on, the CPU 1 accesses the HDD 4 in accordance with the boot program in the ROM 2, loads the OS onto the RAM 3, and executes it. After that the CPU 1 loads various applications from the HDD 4 onto the RAM 3 in accordance with user's instructions from the KB & PD 5, and executes various edit processes. When the user inputs a print instruction on an application program, a printer driver stored in the HDD 4 is launched. The printer driver converts data passed from the application program into a printer language (PDL) which can be interpreted by the printer 200, and outputs the conversion result data as print data to the printer 200 via the network 300.

Figure 3:
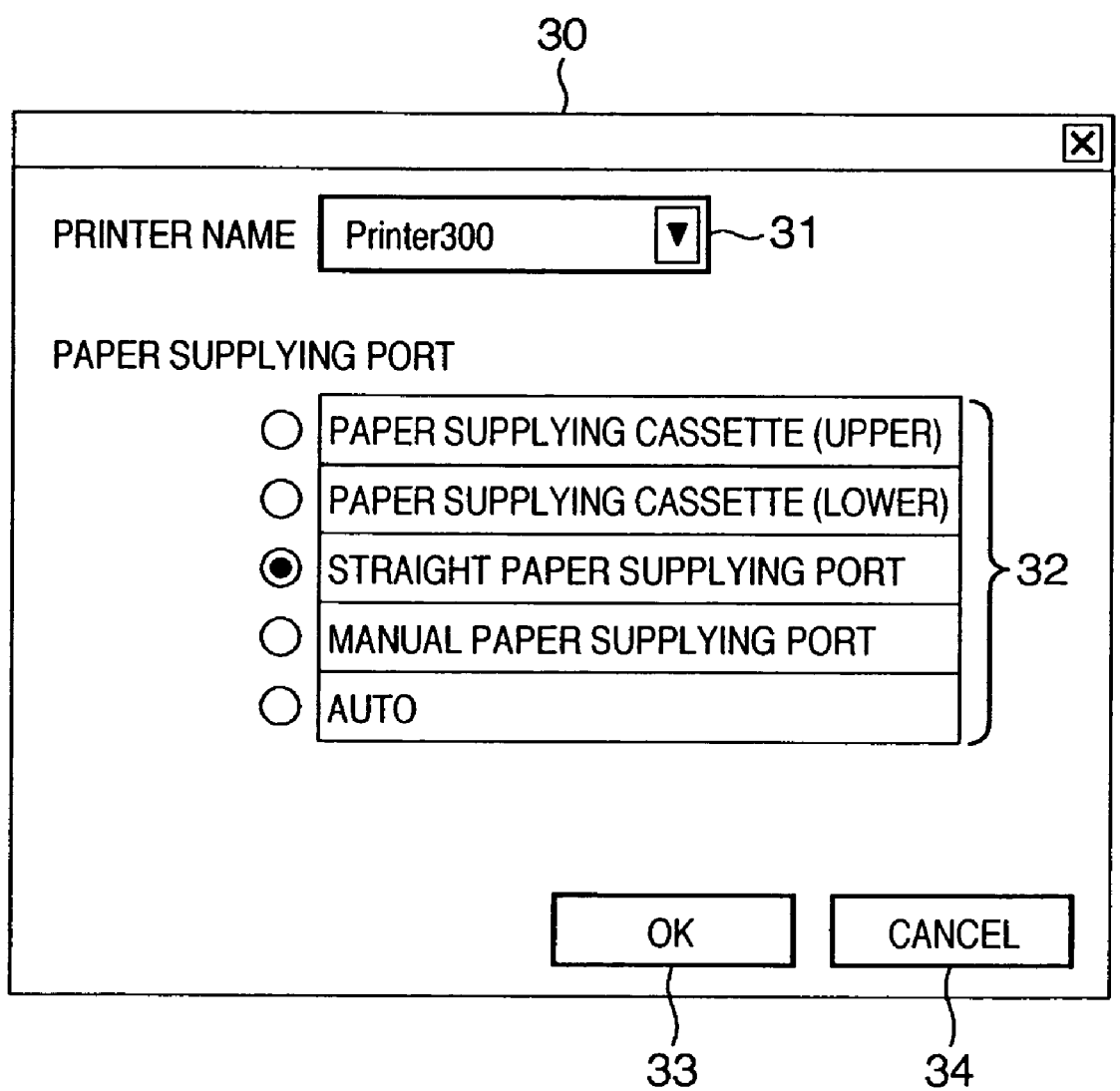
FIG. 3 shows an example of a paper supplying port selection window in a print process.

FIG. 3 shows a print setting window displayed by processing associated with a GUI of the printer driver. This print setting window 30 is displayed when the user designates detailed settings about paper supplying ports of the printer on a print setting window (not shown) including the number of sheets to be printed, the number of pages to be printed, and the like, which is displayed upon inputting the print instruction from the application program.

Referring to FIG. 3, a printer name field 31 displays a model name of the currently selected printer 200. Also, a field 32 displays equipped paper supplying ports on the basis of information from the printer 200. When the user selects another printer in the printer name field 31, information associated with paper supplying ports which depend on that printer is displayed. As a technique for detecting equipped paper supplying ports, an MIB technique using the SNMP protocol is available, and a description thereof will be omitted.

The user selects one desired paper supplying port by clicking a corresponding radio button using the KB & PD 5. "Auto" is selected as a default. However, FIG. 3 shows a state wherein the user explicitly selected "straight paper supplying port" (the straight paper supplying port 203 in FIG. 1). In order to settle the selected contents, the user presses an OK button 33; in order to return the setting to a previous state, he or she presses a cancel button 34. When either button is pressed, this GUI 30 is cleared from the screen, and the setting window including the number of sheets to be printed, the number of pages to be printed, and the like is displayed again. When "auto" is selected as a paper supplying port, the printer driver generates and outputs print data that does not include any command for designating a paper supplying port. In this case, the printer 200 selects a default paper supplying port set on the control panel 206. In this embodiment, assume that the paper supplying cassette 201 is selected as a default. The setting of the paper supplying port is temporarily stored in the RAM 3 as paper supplying port setting information.

Figure 4:
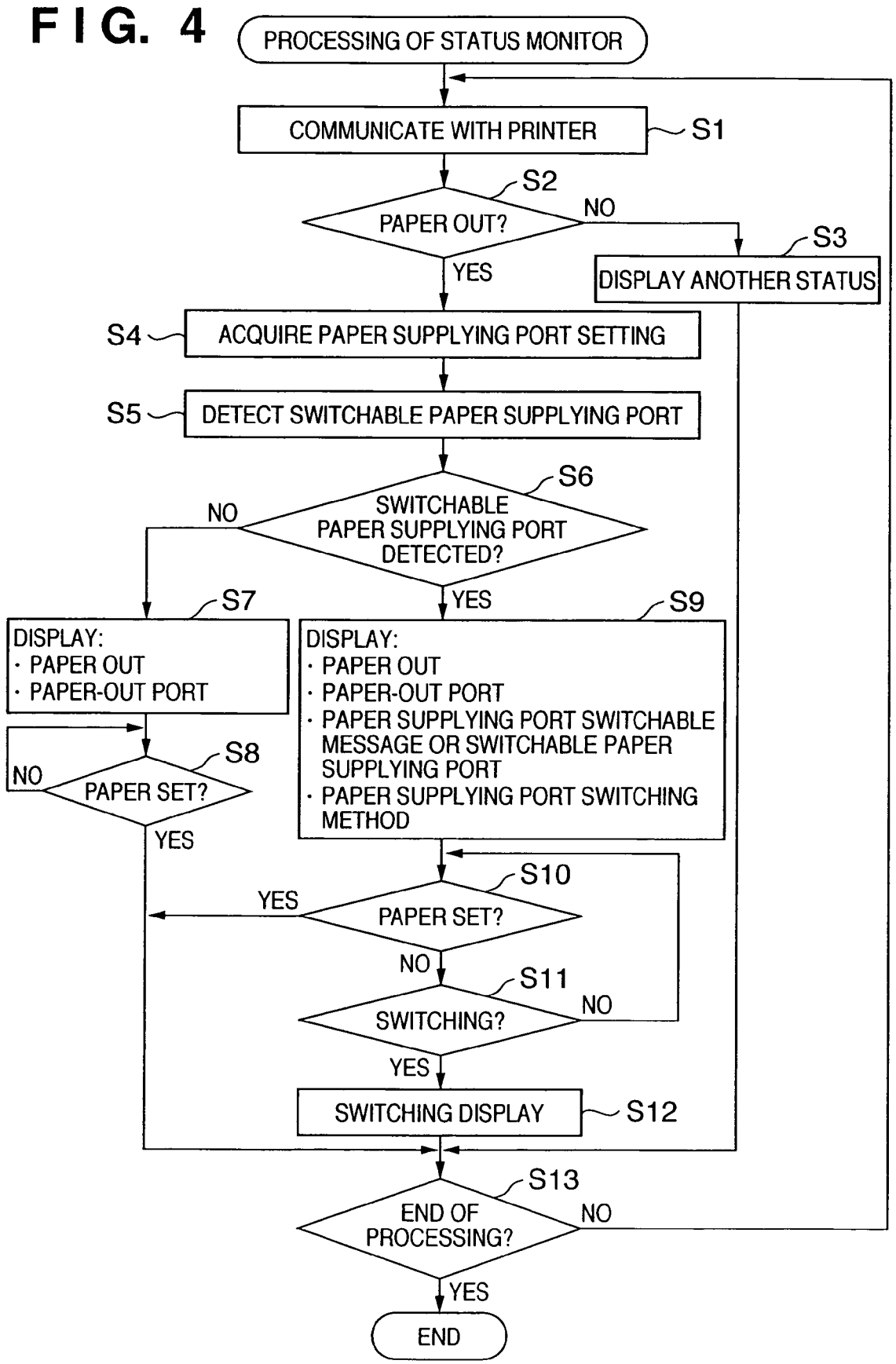
FIG. 4 is a flowchart showing the processing sequence in the first embodiment.

Since the processing itself of the printer driver is known to those who are skilled in the art, this embodiment will explain a monitor program (executed on the PC 100 side) of the printer 200, which serves as a part of the printer driver, with reference to the flowchart of FIG. 4. Note that the output process of print data is executed parallel to the process shown in FIG. 4.

Note that a technique for acquiring status information of the printer 200 adopts MIB. Alternatively, if the OS is that of Microsoft Corporation, such status information can be acquired via a process called a language monitor in a spool sub-system which spools print data and then transmits it to a printing apparatus. Also, a technique called a status monitor is available. Hence, any of these techniques can be adopted.

Upon launching the monitor program (which is launched when the printer driver outputs print data, and quits upon completion of output of a series of print jobs) of this embodiment, a status request is issued to the printer 200 to acquire printer status information in step S1.

It is checked in step S2 based on the acquired status if a paper-out state occurs at the paper supplying port which is used by an outputting print job. If NO in step S2, status other than paper out is displayed in step S3. It is then checked in step S13 if output of the print job is complete. If NO in step S13, the flow returns to step S1 to continue monitoring.

Since the print process processes paper sheets one by one, the flow can return to step S1 at a time interval at which print data per page is output. For this purpose, a page counter used when the printer driver launched as another process outputs print data for one page is monitored, and the flow can return to step S1 at the timing when the page number of the page counter is incremented by "1".

On the other hand, if it is determined in step S2 that a paper-out state has occurred at the paper supplying port which is being used by the print job, the flow advances to step S4 to acquire the paper supplying port setting information of the print job from the RAM 3. It is checked in step S5 if the paper supplying port can be switched, on the basis of whether the current print job explicitly sets a paper supplying port or "auto" is selected as the paper supplying port in FIG. 3. The subsequent process branches depending on this checking result in step S6. That is, if the paper supplying port cannot be switched, i.e., if the user explicitly selected a paper supplying port, the flow advances to step S7 to display a paper-out message, the paper-out port, and the like, and to prompt the user to replenish paper sheets.

The control waits in step S8 until detection of setting of paper sheets at the corresponding paper supplying port of the printer 200. Whether or not paper sheets are re-set is detected by requesting printer status by the same process as in step S1. Note that the printer 200 comprises a sensor for detecting the presence/absence of print sheets for each paper supplying port, and notifies the PC 100 of the detection result of each sensor.

On the other hand, if it is determined in step S6 that the paper supplying port can be switched during printing, the flow advances to step S9 to display a paper-out message, the paper-out port, a message indicating that paper supplying port can be switched, and a paper supplying port to be selected at that time.

The control waits in step S10 or S11 until re-setting of paper sheets at the same paper supplying port is detected, or the user inputs a selection instruction of the paper supplying port to be used on the display window of the PC 100.

If paper sheets are re-set, the flow advances to step S13. If the user selects a new paper supplying port, the flow advances to step S12 to transmit a command that designates the selected paper supplying port. The flow then advances to step S13. The previous paper supplying port setting information in the RAM 3 is updated by information which specifies the newly selected paper supplying port.

FIG. 5 shows an example of paper supplying port setting information stored in the RAM 3 in the above process. FIG. 5 shows an example wherein the user explicitly selected the straight paper supplying port as the paper supplying port in FIG. 3. If the paper supplying port is explicitly designated, it is not switchable, "1" is set as a flag for the selected paper supplying port, and "0" is set for other ports.

Figure 6A:
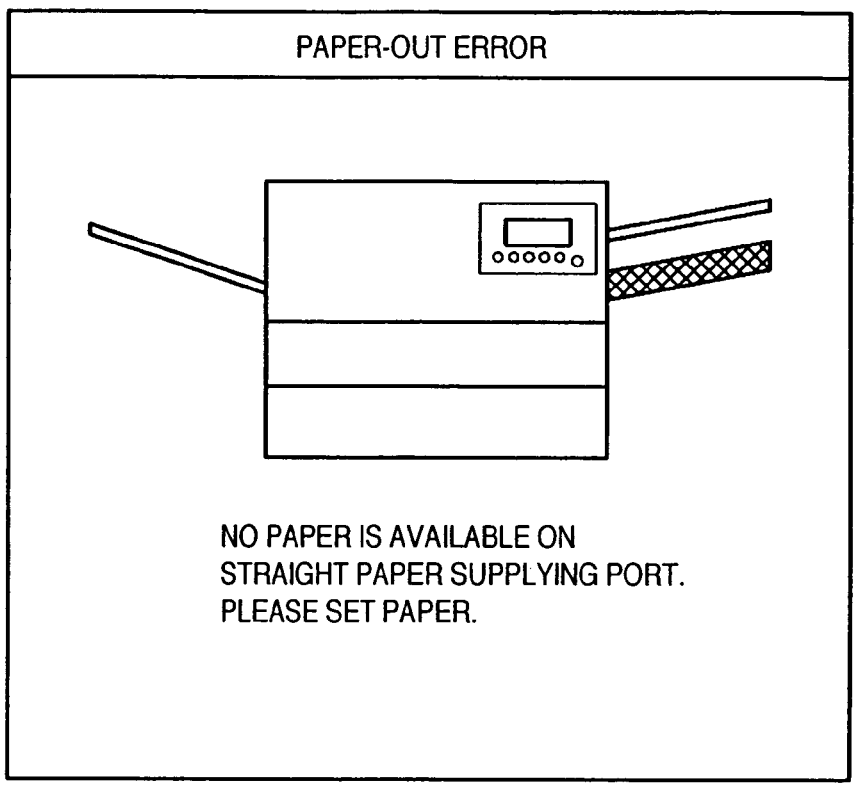
FIGS. 6A and 6B show display examples upon occurrence of a paper-out state in the first embodiment.
Figure 6B:
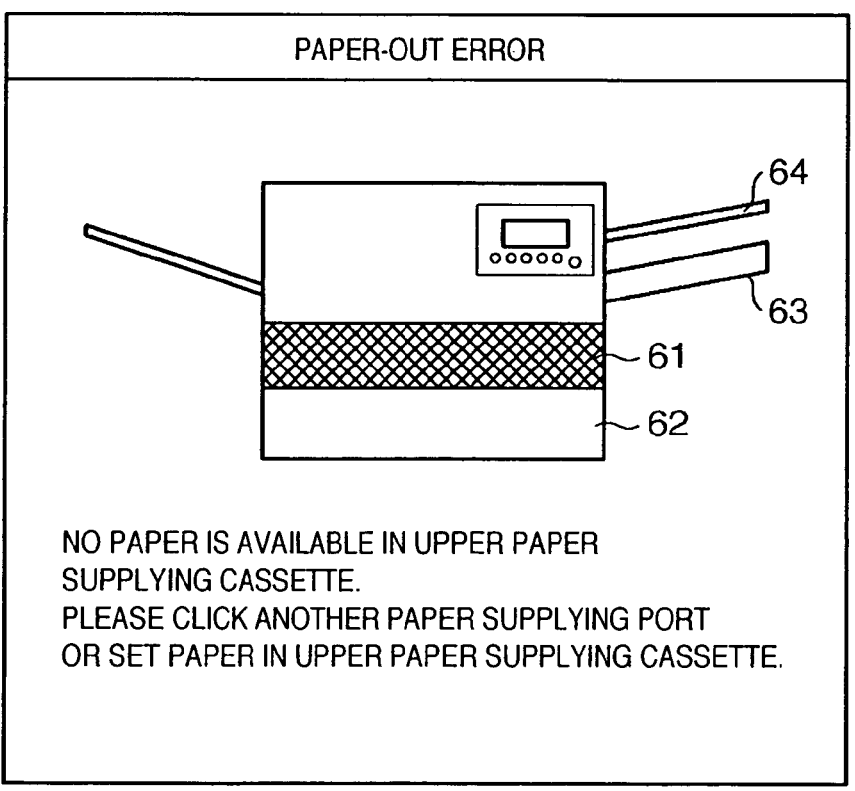

FIG. 6A shows a display example in step S7, and FIG. 6B shows that in step S9. FIGS. 6A and 6B show paper-out states of the paper supplying ports indicated by hatching. That is, the paper-out paper supplying port is identifiably displayed.

In case of FIG. 6B, i.e., in step S9, the user re-sets paper sheets in the paper-out paper supplying port, or selects another paper supplying port. In case of FIG. 6B, the user moves a cursor that cooperates with a pointing device to one of port images 62, 63, and 64 and clicks it to select an alternative paper supplying port.

In case of FIG. 6A, another paper supplying port cannot be selected, and a message indicating a reason for that (i.e., the user explicitly designated a paper supplying port) may be displayed.

As described above, according to the first embodiment, when photos or the like are to be printed on high-quality print sheets, and their paper-out states has occurred, the PC notifies the user to re-set paper sheets in place of selecting another paper supplying port. On the other hand, when no paper supplying port is explicitly designated, and a paper-out state has occurred during printing, the PC notifies the user that printing can be restarted by only selecting another paper supplying port. In this way, helpful information can be presented in a paper-out state, and a defined action to be taken by the user can be notified.

Second Embodiment

The second embodiment will be described below. In the second embodiment, a process based on the types of paper in a paper-out state will be explained. Note that the type of paper is determined by the designation portion indicated as "Paper Type(Y)" in FIG. 18. The type of paper can be determined using detection result of a paper sensor provided in the printer.

In the following description, assume that the printer of the second embodiment comprises a paper supplying port A in which a paper feeding path is moderate and the load on paper sheets to be fed is light, a paper supplying port B in which a paper feeding path has a slow curve, and a slightly heavy load is imposed on paper sheets to be fed, and a paper supplying port C in which a path includes sharp curves such as a U turn and the like, and paper sheets other than plain sheets may be damaged.

Plain sheets can be set on any of these paper supplying ports. High-grade glossy paper sheets (photo paper sheets) cannot use the paper supplying port C, and are set on either paper supplying port A or B. Thick paper sheets can use only the paper supplying port A.

Since the above arrangement is adopted, the printer of the second embodiment does not have the same arrangement as the printer 200 shown in FIG. 1, but it will be described as the printer 200, and the apparatus for outputting print data will be explained as the PC 100 for the sake of simplicity. In the second embodiment, the paper supplying ports A, B, and C of the printer 200 have sensors, which detect plain paper, photo paper, and thick paper, and print status including such detection results is sent to the PC 100. Print sheets are detected by utilizing the fact that photo paper has a higher reflectance than plain paper. Thick paper has substantially the same reflectance as plain paper, but they can be detected using different light transmittances.

A printer driver of the second embodiment acquires a paper-out state and a paper-out port as status information from the printer 200 when it displays paper-out on a status monitor. Furthermore, the printer driver of the second embodiment detects the type of paper for generated print data whose process is in progress via a language monitor that interprets the print data. Moreover, the printer driver checks a paper supplying port, which can supply the paper type of interest, of those of the printer using an information table (allocated on the RAM 3) that manages available paper supplying ports for respective paper type settings. When the printer driver determines that paper sheets can be supplied from a paper supplying port other than the paper-out paper supplying port, the status monitor displays a message indicating that the paper supplying port can be switched, the paper supplying port to be switched, a method of switching the paper supplying port by means of a paper supplying port changeover switch operation, and the like in addition to display of a detection message of the paper-out state, and the detected paper-out port.

Figure 7:
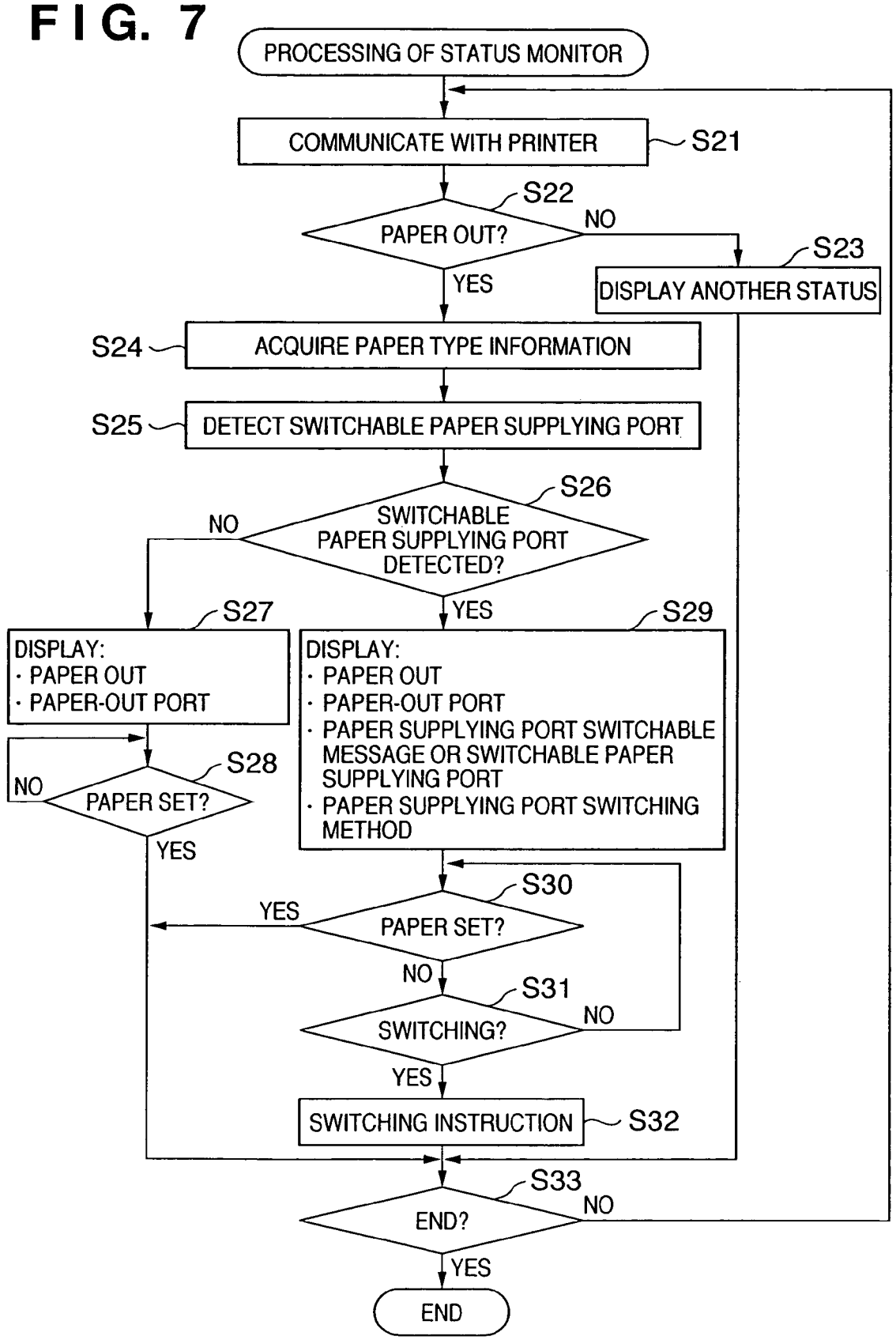
FIG. 7 is a flowchart showing the processing sequence in the second embodiment.

The processing sequence of the aforementioned printer driver of the second embodiment will be explained below with reference to the flowchart of FIG. 7. This process corresponds to FIG. 4 described in the first embodiment.

In step S21, the printer driver communicates with the printer 200 to acquire printer status. The printer driver communicates with the printer 200 via the language monitor. However, the status monitor may directly communicate with the printer 200.

The printer driver checks in step S22 if the acquired status includes paper-out information. If the acquired status does not include any paper-out information, the printer driver displays status other than paper out in step S23, and checks in step S33 if output of a print job is complete. If NO in step S33, the flow returns to step S21 to continue monitoring.

On the other hand, if it is determined in step S22 that the paper-out state has occurred, the flow advances to step S24 to detect the type of paper of data for which a print job of interest is generated. Furthermore, the printer driver detects a paper supplying port that can supply the target paper type of the print data, which has encountered the paper-out state, of those of the printer, with reference to an information table (RAM 3) that manages available paper supplying ports for respective paper type settings.

If it is determined that paper sheets cannot be supplied from a paper supplying port other than the paper-out paper supplying port, the flow advances to step S27 to display a paper-out message, a paper-out port, and a message that prompts the user to set paper sheets. The control then waits in step S28 until paper sheets are re-set.

On the other hand, if it is determined in step S26 that paper sheets can be supplied from a paper supplying port other than the paper-out paper supplying port, the printer driver displays a paper-out message, a paper-out port, a message indicating that the paper supplying port can be switched, and switchable paper supplying ports that can be selected in step S29.

In steps S30 and S31, the control waits until paper sheets are re-set or a new paper supplying port is selected. If a new paper supplying port is selected, the printer driver outputs a command for switching to the selected paper supplying port to the printer 200 in step S32.

The information table which is used in the checking process in step S25 and manages available paper supplying ports for respective paper type settings is, as shown in, e.g., FIG. 8.

A case will be examined below wherein the user issues a print job that prints on plain paper sheets at the PC 100, and a paper-out state occurs during printing using the paper supplying port A. In this case, the remaining paper supplying ports B and C become selection candidates with reference to the table of FIG. 8. Hence, the paper types (included in printer status acquired in step S21) set at the paper supplying ports B and C are checked in the order named, and if plain paper sheets are set in either port, it is determined that the port can be selected. If plain paper sheets are set in neither of these ports, it is determined that another port cannot be selected.

If the user issues a job that prints on thick paper sheets, since only the paper supplying port C is available with reference to the table of FIG. 8, it is unconditionally determined that another port cannot be selected.

Note that the display contents in steps S27 and S29 are substantially the same as those in steps S7 and S9 in the first embodiment.

As described above, according to the second embodiment, when the paper type is designated in a print job, and a paper-out state occurs, if paper sheets of the same type are set in another paper supplying port, the print job can be continued by switching the current paper supplying port to that paper supplying port. If print sheets of the same type are not set, the PC can prompt the user to re-set paper sheets. Hence, appropriate action or operation contents to be taken by the user can be notified.

Third Embodiment

The first and second embodiments have been explained under the condition that paper sheets set at the respective paper supplying ports of the printer 200 have the same paper size. In the description of the third embodiment, assume that paper sheets set at respective paper supplying ports may have different paper sizes. However, for the sake of simplicity, paper sheets set at respective paper supplying ports have the same paper type. In the following description, assume that paper size detection itself is a state-of-the-art technique, and information associated with the detected paper sizes is sent to the PC 100 as printer status.

Assume that the printer 200 has three paper supplying ports A, B, and C, and paper sizes which can be set at these paper supplying ports are as follows.

Paper supplying port A: A3, A4, standard-size postcard, and name card

Paper supplying port B: A3, A4, and standard-size postcard

Paper supplying port C: A3 and A4

A printer driver of the third embodiment acquires a paper-out state and a paper-out port as status information when it displays paper-out on a status monitor. At this time, the printer driver also acquires information of paper sizes (in case of the presence of paper sheets) set at respective paper supplying ports. The printer driver detects the size of paper of generated print data whose process is in progress via a language monitor that interprets the print data. Moreover, the printer driver checks a paper supplying port, which can supply the paper size of interest, of those of the printer. When the printer driver determines that paper sheets can be supplied from a paper supplying port other than the paper-out paper supplying port, the status monitor displays a message indicating that the paper supplying port can be switched, the paper supplying port to be switched, a method of switching the paper supplying port by means of a paper supplying port changeover switch operation, and the like in addition to display of a detection message of the paper-out state, and the detected paper-out port.

Figure 9:
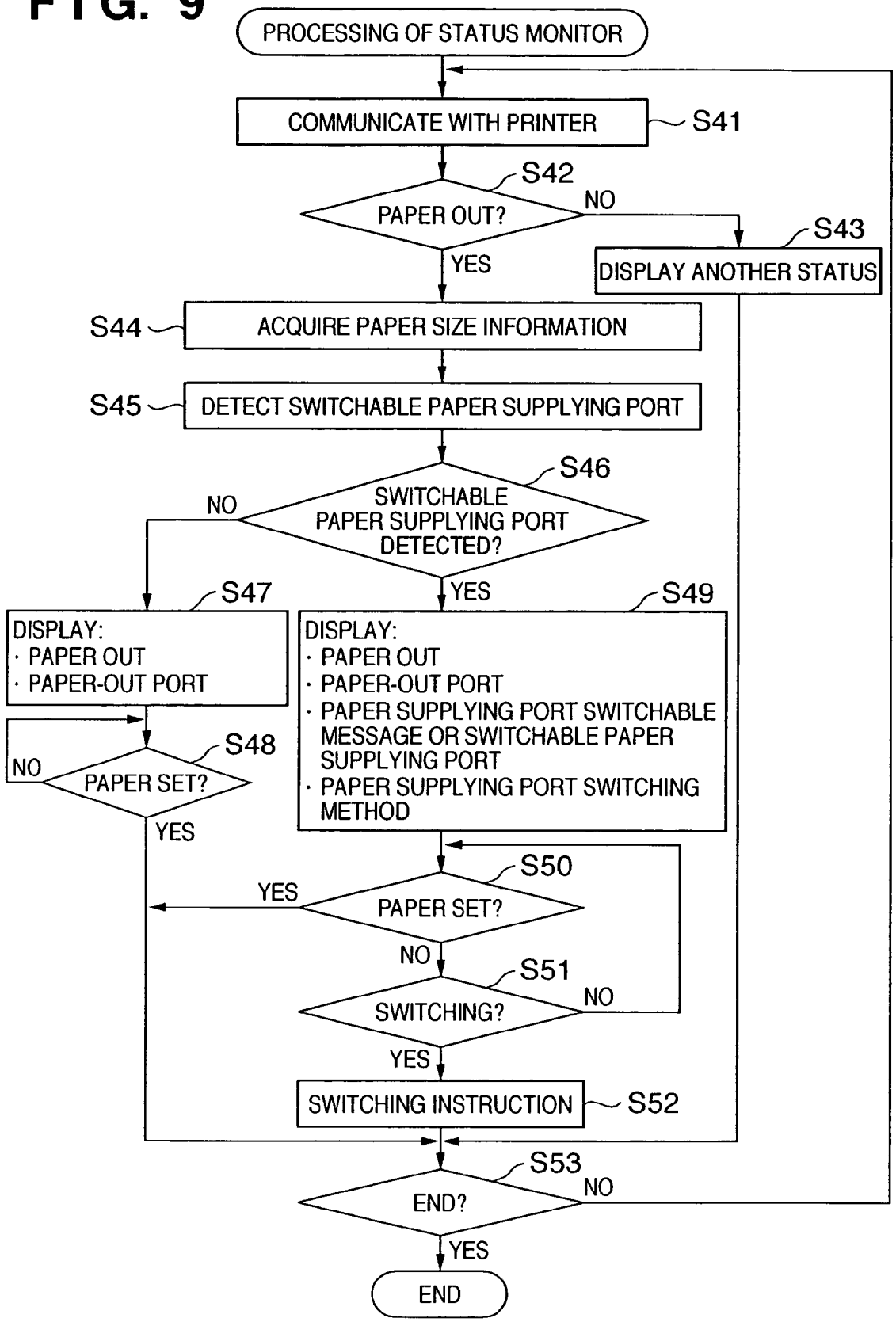
FIG. 9 is a flowchart showing the processing sequence in the third embodiment.

The aforementioned sequence will be described below with reference to the flowchart of FIG. 9. This process corresponds to FIG. 4 described in the first embodiment.

In step S41, the printer driver communicates with the printer 200 to acquire printer status. However, the status monitor may directly communicate with the printer 200. Also, the printer driver communicates with the printer 200 via the language monitor. The printer driver checks in step S42 if the acquired status includes paper-out information. If the acquired status does not include any paper-out information, the printer driver displays status other than paper out in step S43, and checks in step S53 if output of a print job is complete. If NO in step S53, the flow returns to step S41 to continue monitoring.

On the other hand, if a paper-out state is detected in step S42, the flow advances to step S44 to detect the paper size of data for which a print job of interest is generated. Furthermore, the printer driver detects in step S45 a paper supplying port that can supply the target paper size of the print data, which has encountered the paper-out state, of those of the printer, with reference to an information table that manages available paper supplying ports for respective paper sizes.

If it is determined that paper sheets cannot be supplied from a paper supplying port other than the paper-out paper supplying port, the printer driver displays a paper-out message, a paper-out port, and a message that prompts the user to set paper sheets in step S47. The control then waits in step S48 until paper sheets are re-set.

On the other hand, if it is determined in step S46 that paper sheets can be supplied from a paper supplying port other than the paper-out paper supplying port, the printer driver displays a paper-out message, a paper-out port, a message indicating that the paper supplying port can be switched, and switchable paper supplying ports that can be selected in step S49.

In steps S50 and S51, the control waits until paper sheets are re-set or a new paper supplying port is selected. If a new paper supplying port is selected, the printer driver outputs a command for switching to the selected paper supplying port to the printer 200 in step S52.

The information table (allocated on the RAM 3) which is used in the checking process in step S45 and manages available paper supplying ports for respective paper sizes is, as shown in, e.g., FIG. 10.

A case will be examined below wherein the user issues a print job that prints on the paper size A4, and a paper-out state occurs during printing using the paper supplying port A. In this case, the remaining paper supplying ports B and C become selection candidates with reference to the table of FIG. 10. Hence, the paper sizes (included in printer status acquired in step S41) set at the paper supplying ports B and C are checked in the order named, and if the A4 size is set in either port, it is determined that the port can be selected. If the A4 size is set in neither of these ports, it is determined that another port cannot be selected.

If the user issues a job that prints on the name card size, since only the paper supplying port A is available with reference to the table of FIG. 10, it is unconditionally determined that another port cannot be selected.

Note that the display contents in steps S47 and S49 are substantially the same as those in steps S7 and S9 in the first embodiment.

As described above, according to the third embodiment, when the paper size is designated in a print job, and a paper-out state occurs, if paper sheets of the same size are set in another paper supplying port, the print job can be continued by switching the current paper supplying port to that paper supplying port. If print sheets of the same size are not set, the PC can prompt the user to re-set paper sheets. Hence, appropriate action or operation contents to be taken by the user can be notified.

Fourth Embodiment

Figure 18:
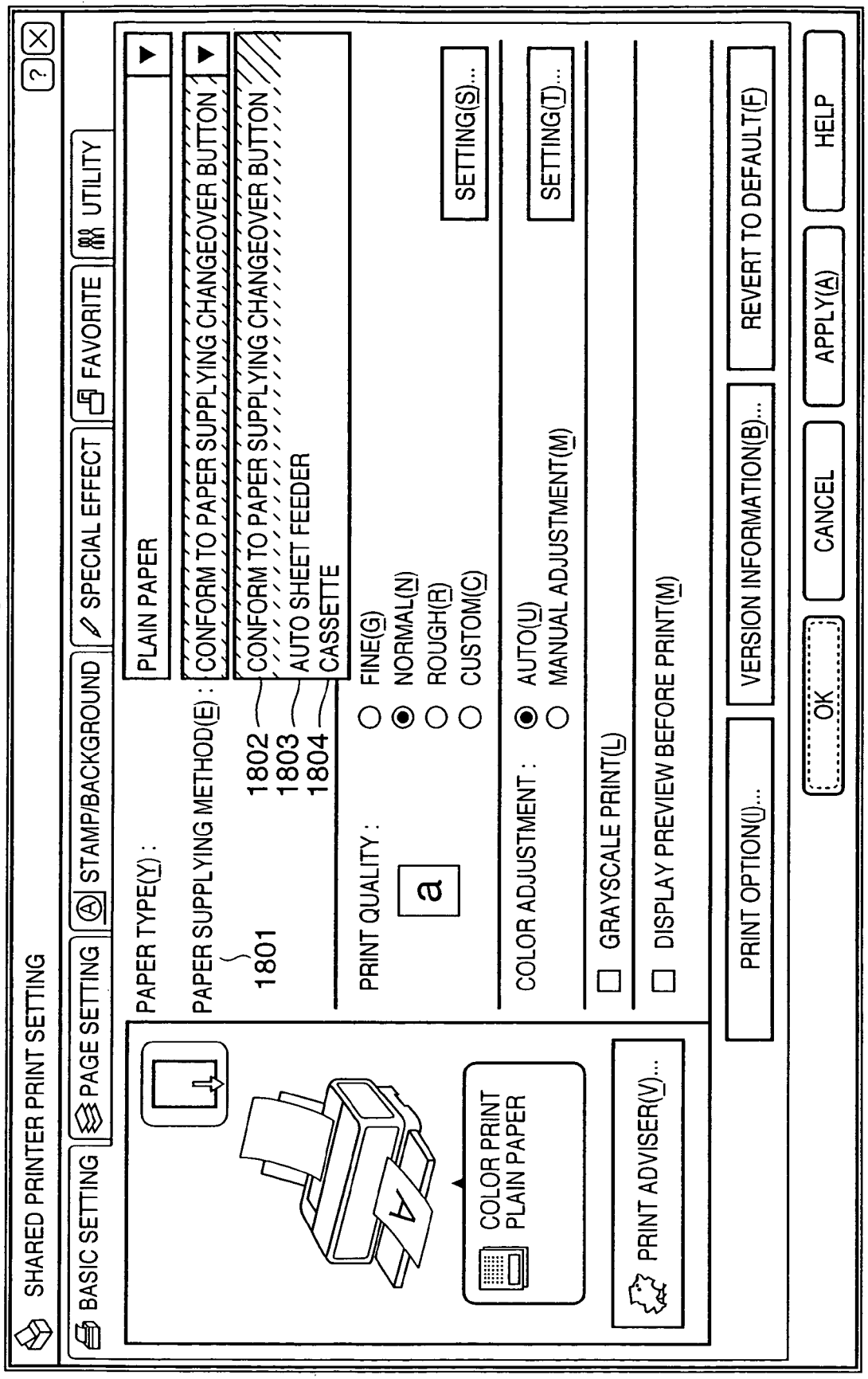
FIG. 18 shows an example of a print setting window to be displayed.

The fourth embodiment will be described below. FIG. 18 shows a detailed print condition setting window which is displayed by a program associated with a GUI of a printer driver of the fourth embodiment. This window is displayed when the user issues a print instruction on an application that runs on the PC 100 and clicks a printer property button (not shown) on a GUI used to set the number of copies to be printed, and the like.

A paper supplying method setting field 1801 on the setting window shown in FIG. 18 allows the user to select one of "auto cassette feeder" 1803, "cassette" 1804, and "conform to paper supply switching button" 1802. When "conform to paper supply switching button" 1802 is selected, a print process is done using print sheets from a paper supplying port set on the printer main body side.

In addition, settings associated with print quality and the like can be made. The printer driver generates print data according to the contents set on this window, and outputs the print data to the printer 200.

Figure 11:
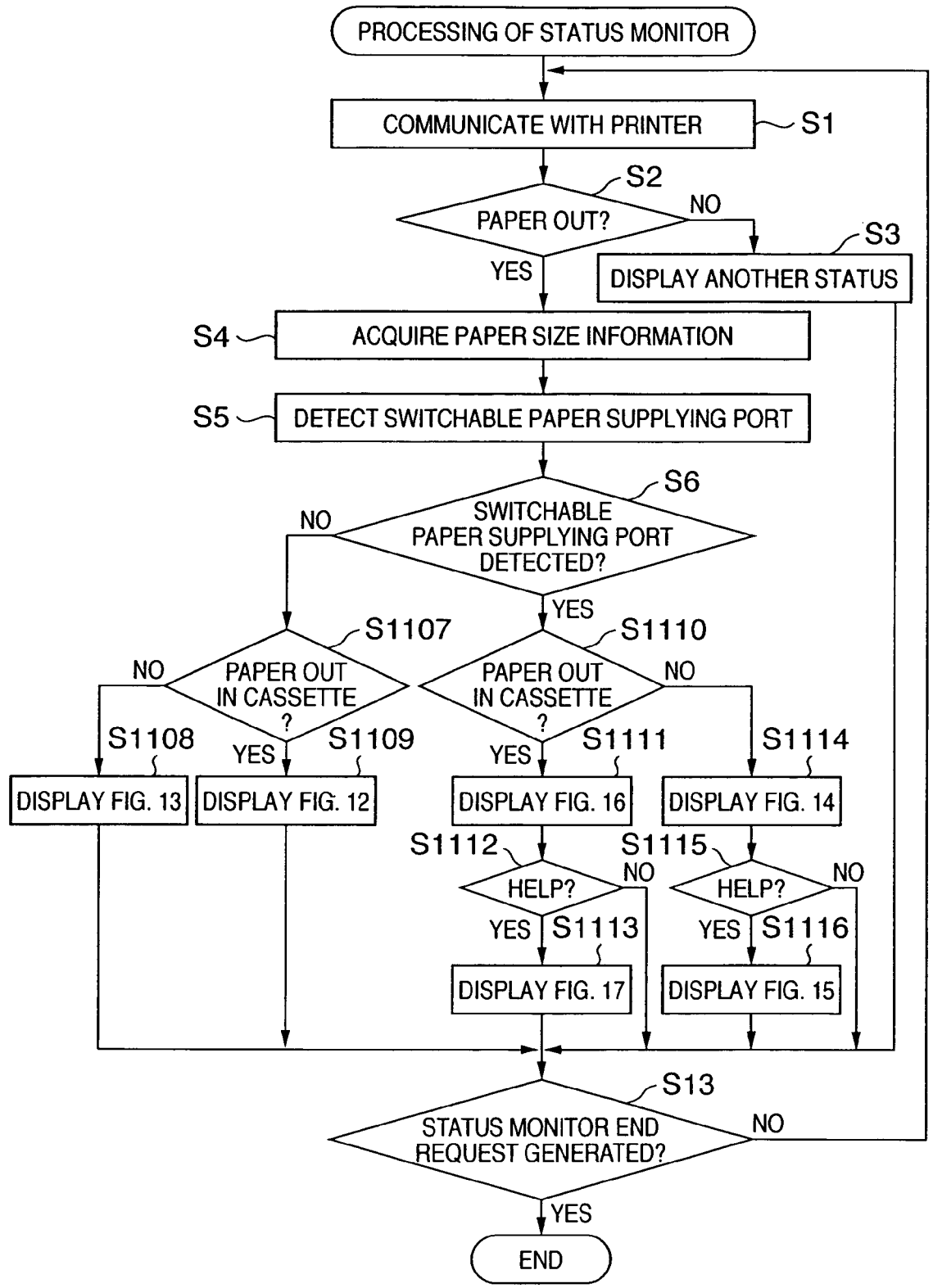
FIG. 11 is a flowchart showing an example of the processing flow in the fourth embodiment.

Since the print data generation process by the printer driver is known to those skilled in the art, a monitor program (executed on the PC 100 side) of the printer 200 which serves as a part of the printer driver will be explained in this embodiment with reference to the flowchart of FIG. 11.

Note that a technique for acquiring status information of the printer 200 adopts MIB. Alternatively, if the OS is that of Microsoft Corporation, such status information can be acquired via a process called a language monitor in a spool sub-system which spools print and then transmits it to a printing apparatus. Also, a technique called a status monitor is available. Hence, any of these techniques can be adopted. Note that the same step numbers denote the same processes as those in FIG. 4.

Upon launching the monitor program (which is launched when the printer driver outputs print data, and quits upon completion of output of a series of print jobs) of this embodiment, a status request is issued to the printer 200 to acquire printer status information in step S1. Note that the status information stores information indicating the presence/absence of paper sheets for respective paper supplying ports. For example, status indicating a paper-out state of the paper supplying cassette, that of an auto sheet feeder, and the like is acquired.

It is checked in step S2 based on the acquired status if a paper-out state occurs at the paper supplying port which is used by an outputting print job. If NO in step S2, status other than paper out is displayed in step S3. It is then checked in step S13 if output of the print job is complete. If NO in step S13, the flow returns to step S1 to continue monitoring.

Note that the status acquisition interval of the status monitor falls within 2 to 4 sec, and the flow returns to step S1 within this interval. Alternatively, status information may be acquired at intervals at which printing for one page is completed on a print sheet, as described above.

On the other hand, if it is determined in step S2 that a paper-out state has occurred at the paper supplying port which is being used by the print job, the flow advances to step S4 to acquire the paper supplying port setting information of the print job from the RAM 3. It is checked in step S5 if the current print job explicitly sets the paper supplying port.

If either "auto cassette feeder" 1803 or "cassette" 1804 is selected on the setting window in FIG. 18, it is determined that the paper supplying port is explicitly selected. On the other hand, if "conform to paper supply switching button" 1802 is selected, since the setting on the printer 200 side is preferentially used, it is determined that the paper supplying port is not explicitly selected.

The subsequent process branches in step S6 based on this checking result.

If the paper supplying port cannot be switched, i.e., if the user explicitly selects the paper supplying port, a paper-out state of the cassette is checked in step S1107. If the paper-out state of the cassette is detected, i.e., if it is determined that the status information acquired in step S2 includes paper-out information of the cassette, the flow advances to step S1109 to display a window shown in FIG. 12. If NO in step S1107, i.e., if the paper-out information of the auto sheet feeder is acquired, the flow advances to step S1108 to display a window shown in FIG. 13.

Either window graphically displays a paper supplying method and the subsequent action sequence for the operator.

On the other hand, if it is determined in step S6 that the paper supplying port can be switched during printing (if "conform to paper supply switching button" 1802 is selected as the paper supplying method 1801 in FIG. 18), the flow advances to step S1110 to check a paper-out state of the cassette. That is, if the status information acquired in step S2 includes paper-out information of the cassette, the flow advances to step S1111 to display a window in FIG. 16. It is checked in step S1112 if the user clicks a "how to switch paper supplying method" button 1601 (help) on the window in FIG. 16. If it is determined that the user clicks the "how to switch paper supplying method" button 1601 (help) on the window in FIG. 16, the flow advances to step S1113 to display a window in FIG. 17, and the flow advances to step S13. If NO in step S1110, i.e., if the paper-out information of the auto sheet feeder is acquired, the flow advances to step S1114 to display a window in FIG. 14. It is checked in step S1115 if the user clicks a "how to switch paper supplying method" button 1401 (help) on the window in FIG. 14. If it is determined that the user clicks the "how to switch paper supplying method" button 1401 (help) on the window in FIG. 14, the flow advances to step S1113 to display the window in FIG. 17, and the flow advances to step S13.

Figure 14:
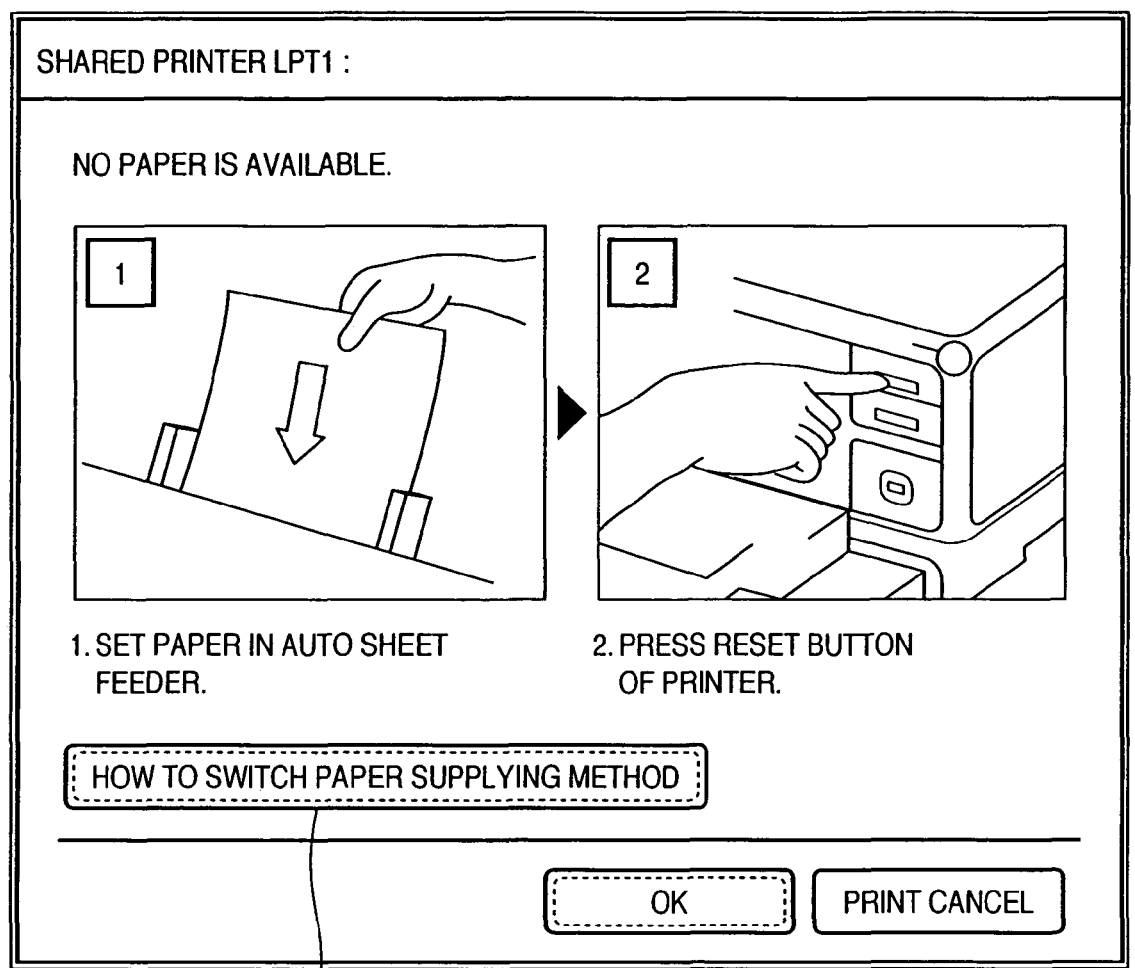
FIG. 14 shows an example of a window to be displayed in a paper-out state.

In this embodiment, the windows in FIGS. 14 and 15 are displayed as independent windows, but they may be displayed as a single window. Also, the windows in FIGS. 16 and 17 may be displayed together as a single window.

Figure 12:
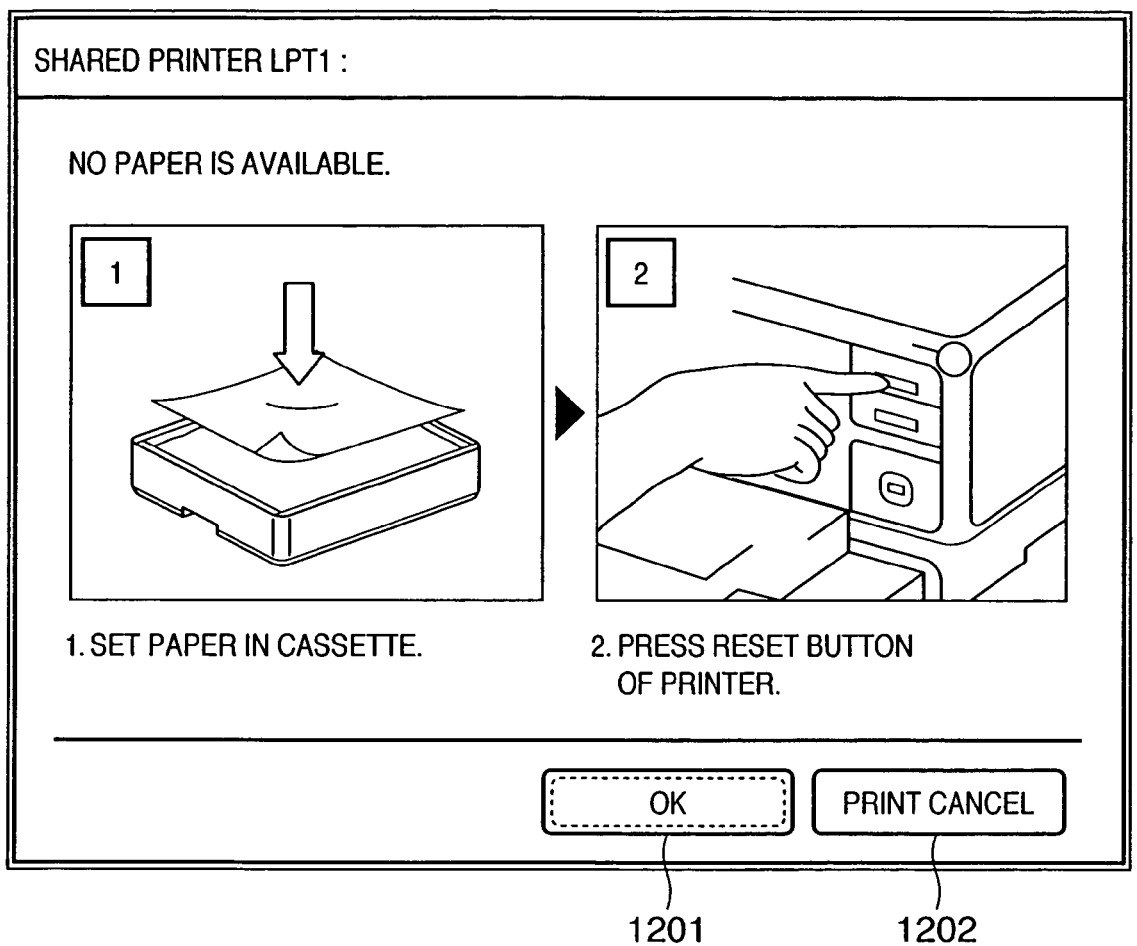
FIG. 12 shows an example of a window to be displayed in a paper-out state.
Figure 13:
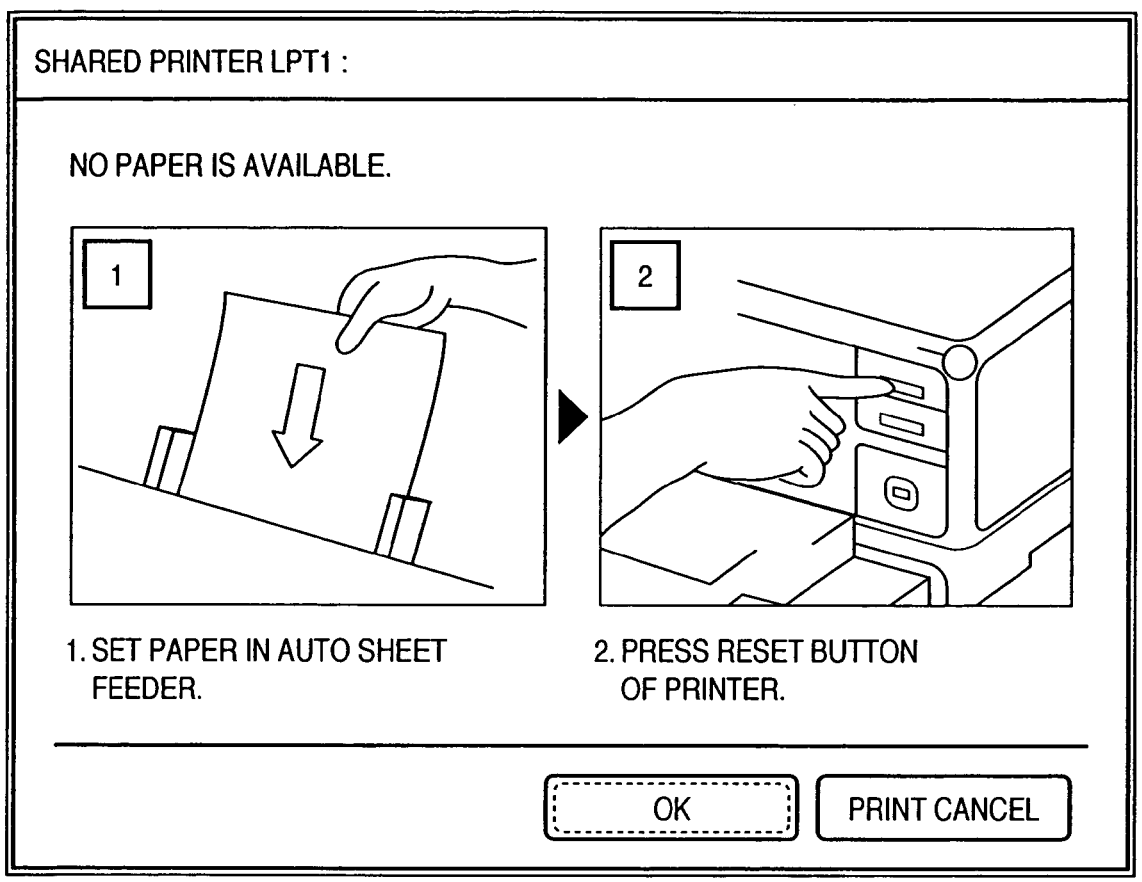
FIG. 13 shows an example of a window to be displayed in a paper-out state.

As described above, according to this embodiment, when it is set to conform to the cassette on the setting window in FIG. 18, if the user sets paper sheets in the cassette, and presses a reset button in FIG. 12, the print process can be continued. On the other hand, if the user sets paper sheets on the auto sheet feeder, and presses the reset button in FIG. 13, the print process can be continued.

When it is set to conform to the paper supply switching button in FIG. 18, the window shown in FIG. 14 is displayed. If the user clicks the "how to switch paper supplying method" button 1401 while this window is displayed, the help window in FIG. 15 is displayed. As shown in FIG. 15, in order to specify a button to be pressed of a plurality of buttons of the printer, marks 1501 and 1502 are displayed as composite images. As a result, when the user switches the paper supply switching button of the printer main body from the auto sheet feeder to the cassette and presses the reset button of the main body, the printer feeds a paper sheet from the cassette, thus continuing the print process.

Figure 16:
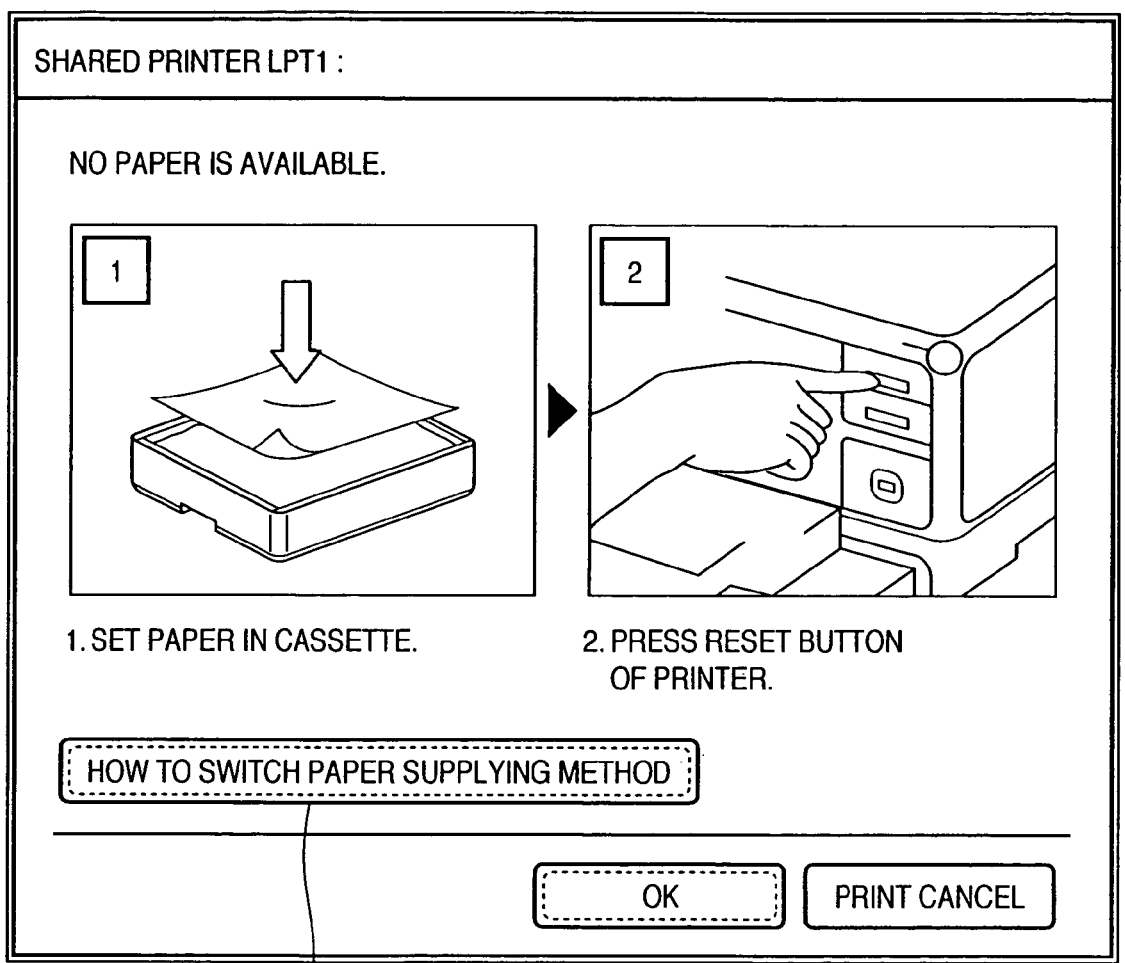
FIG. 16 shows an example of a window to be displayed in a paper-out state.
Figure 17:
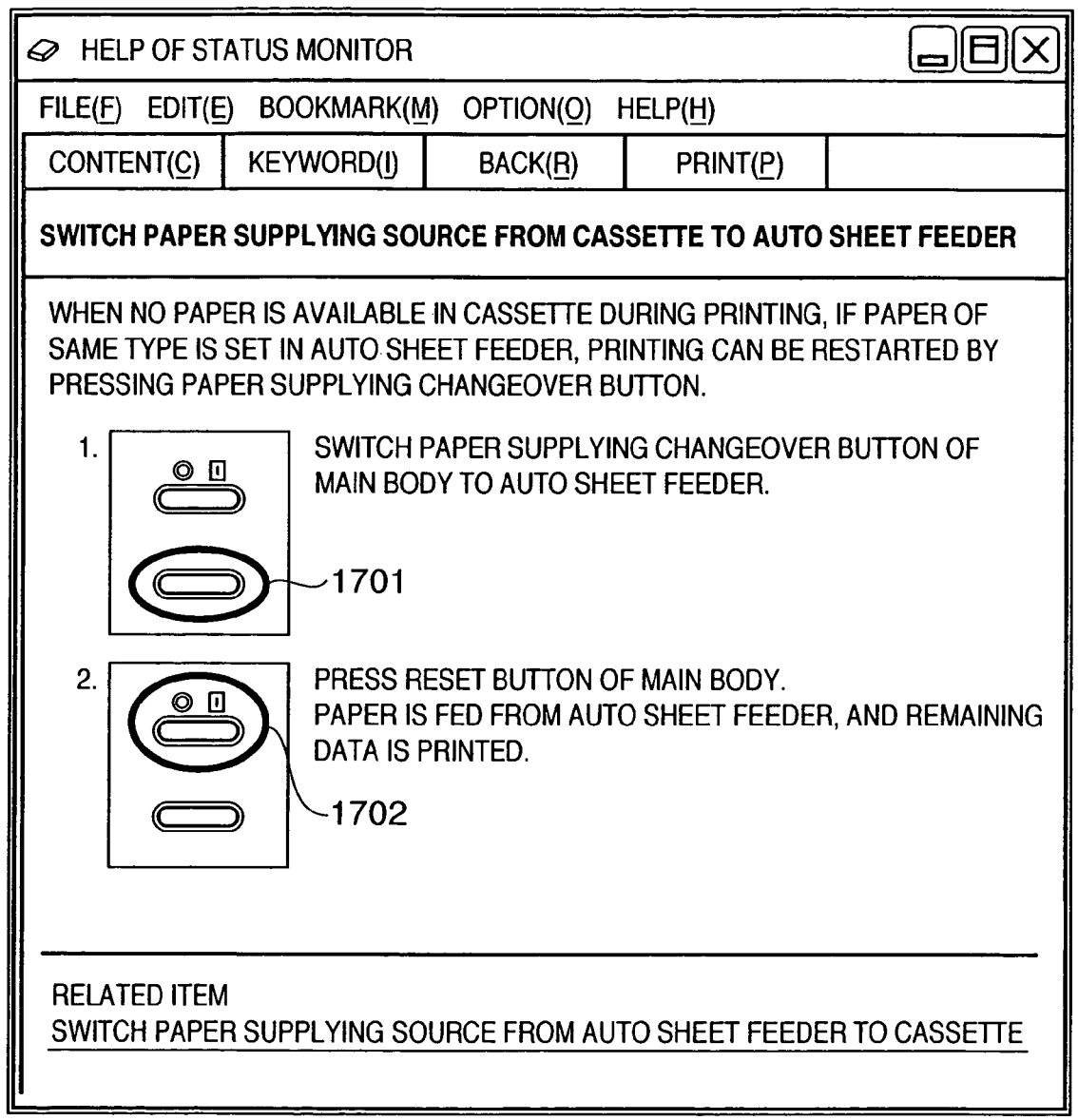
FIG. 17 shows an example of a help window to be displayed.

When the user clicks the "how to switch paper supplying method" button 1601 while the window in FIG. 16 is displayed, the help window in FIG. 17 is displayed. On this window as well, in order to specify a button to be pressed of a plurality of buttons of the printer, marks 1701 and 1702 are displayed as composite images. As a result, when the user switches the paper supply switching button of the printer main body from the cassette to the auto sheet feeder and presses the reset button of the main body, the printer feeds a paper sheet from the auto sheet feeder, thus continuing the print process.

That is, the user can be informed that the printing process can be continued if another paper supplying method is selected depending on the paper supplying method designated by the user (when the user selects "conform to paper supply switching button" in FIG. 18). Hence, if the user knows that the same paper sheets are set on the cassette and auto sheet feeder, he or she can select another paper supplying method to continue the print process without replenishing paper sheets to the cassette or auto sheet feeder in the paper-out state. If the user knows that the same paper sheets are not set on the cassette and auto sheet feeder, he or she can continue the print process by replenishing paper sheets to the cassette or auto sheet feeder in the paper-out state.

Fifth Embodiment

Two or more ones of the first to fourth embodiments described above may be combined. For example, the first and second embodiments may be combined. In this case, when the status monitor detects paper out, paper supplying port designation information and paper type information included in print data are detected, and a switchable paper supplying port is detected from a combination of the information table that manages paper supplying port designation and switchable paper supplying ports, and the information table that manages the paper type and available paper supplying port, and the detected paper supplying port is displayed on the window. In this case, the same window as in FIG. 6A may be displayed, and a GUI shown in FIG. 6B is displayed upon switching.

As a result, the operation and effect as combinations of the first to third embodiments can be expected.

Other Embodiments

In each of the embodiments, when a paper-out state has occurred, and another paper supplying port is selectable, paper sheets are re-set at the paper-out paper supplying port, or a selection command is automatically output to the printer upon selecting the other paper supplying port on the GUI.

Since the paper supplying port can be selected on the PC side, a print job is preferably executed from a remote place. When the PC need only prompt the user to take the next action, it can display only selectable paper supplying ports. That is, the user can be notified of helpful information indicating whether he or she must re-set paper sheets or can select another paper supplying port.

As is apparent from the description of the above embodiments, this embodiment is characterized in a computer program executed on the PC 100 side. Normally, since the computer program is ready to run after a computer-readable storage medium such as a CD-ROM or the like is set in a computer, and the computer program is copied or installed in the system, the scope of the present invention includes such computer-readable storage medium.

As described above, according to the present invention, when paper-out information is sent from the printer while a print job is output to the printer, appropriate information of the next action or operation to be taken by the user can be provided on the basis of the properties of the print job and status sent from the printer.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-194288 filed on Jun. 30, 2004, which is hereby incorporated by reference herein.

What is claimed is:
1. An information processing apparatus comprising:
a designation unit that activates a printer driver installed on the information processing apparatus to display a menu that designates, as a paper supply source, one of a first paper supplying port, a second paper supplying port, and a source indicated by a paper supply switching button provided on a printer, which sets paper to be supplied from either the first paper supplying port or the second paper supplying port;

an output unit that generates, using the printer driver, print data including information indicating an item designated on the menu and outputs the print data to the printer as a print job;

a determination unit that determines whether or not the print job to be outputted by said output unit is a job to be printed on a paper supplied from the paper supply source according to the paper supply switching button provided on the printer; and a display unit that displays, when the out-of-paper state occurs in the printer, (i) information which indicates lack of paper, a prompt to replenish the paper to resume the printing of the print job, and a button indicating how to switch a paper supplying method, if said determination unit determines that the print job outputted by said output unit is a job to be printed on the paper supplied from the paper supply source according to the paper supplying switching button provided on the printer, or (ii) information which indicates lack of paper and a prompt to replenish paper to resume the printing of the print job without displaying the button indicating how to switch the paper supplying method, if said determination unit determines that the print job outputted by said output unit is not a job to be printed on the paper supplied from the paper supply source according to the paper supplying switching button provided on the printer, wherein when the button indicating how to switch the paper supplying method is designated by a user, said display unit displays information indicating that printing of the print job can resume by switching from the first paper supplying port to the second paper supplying port or switching from the second paper supplying port to the first paper supplying port.

2. The apparatus according to claim 1, wherein the first paper supplying port includes a manual paper supplying port and the second paper supplying port includes a paper supplying cassette.

3. The apparatus according to claim 2, further comprising a second determination unit that, when the out-of-paper state occurs in the printer, determines whether the out-of-paper state occurs in the paper supplying cassette of the printer, wherein said display unit displays, if said determination unit determines that the paper supply switching button is selected when the out-of-paper state occurs in the printer and said second determination unit determines that the out-of-paper state occurs in the paper supplying cassette of the printer, information which indicates lack of paper and that printing of the print job can resume by switching from the paper supplying cassette to the manual paper supplying port, and wherein said display unit displays, if said determination unit determines that the paper supply switching button is selected when the out-of-paper state occurs in the printer and said second determination unit determines that the out-of-paper state does not occur in the paper supplying cassette of the printer, information which indicates lack of paper and that printing of the print job can resume by switching from the manual paper supplying port to the paper supplying cassette.

4. An apparatus-implemented print control method of an information processing apparatus, comprising:

a designation step that activates a printer driver installed on the information processing apparatus to display a menu that designates, as a paper supply source, one of a first paper supplying port, a second paper supplying port, and a source indicated by a paper supply switching button provided on a printer, which sets paper to be supplied from either the first paper supplying port or the second paper supplying port;

an output step that designates, using the printer driver, print data including information indicating an item designated on the menu and outputs the print data to the printer as a print job;

a determination step that determines whether or not the print job to be outputted by said output step is a job to be printed on a paper supplied from the paper supply source according to the paper supply switching button provided on the printer; and a display step that displays, when the out-of-paper state occurs in the printer, (i) information which indicates lack of paper, a prompt to replenish the paper to resume the printing of the print job, and a button indicating how to switch a paper supplying method, if said determination step determines that the print job outputted by said output step is a job to be printed on the paper supplied from the paper supply source according to the paper supplying switching button provided on the printer, or (ii) information which indicates lack of paper and a prompt to replenish paper to resume the printing of the print job without displaying the button indicating how to switch the paper supplying method, if said determination step determines that the print job outputted by said output step is not a job to be printed on the paper supplied from the paper supply source accord button provided on the printer, wherein when the button indicating how to switch the paper supplying method is designated by a user, said display step displays information indicating that printing of the print job can resume by switching from the first paper supplying port to the second paper supplying port or switching from the second paper supplying port to the first paper supplying port.

5. The apparatus-implemented print control method according to claim 4, wherein the first paper supplying port includes a manual paper supplying port and the second paper supplying port includes a paper supplying cassette.

6. The apparatus-implemented print control method according to claim 5, further comprising a second determination step that, when the out-of-paper state occurs in the printer, determines whether the out-of-paper state occurs in the paper supplying cassette of the printer, wherein said display step displays, if said determination step determines that the paper supply switching button is selected when the out-of-paper state occurs in the printer and said second determination step determines that the out-of-paper state occurs in the paper supplying cassette of the printer, information which indicates lack of paper and that printing of the print job can resume by switching from the paper supplying cassette to the manual paper supplying port, and wherein said display step displays, if said determination step determines that the paper supply switching button is selected when the out-of-paper state occurs in the printer and said second determination step determines that the out-of-paper state does not occur in the paper supplying cassette of the printer, information which indicates lack of paper and that printing of the print job can resume by switching from the manual paper supplying port to the paper supplying cassette.

7. A non-transitory computer readable recording medium on which is encoded a program making a computer function as an information processing apparatus, said program comprising:
   a designation unit that activates a printer driver installed on the information processing apparatus to display a menu that designates, as a paper supply source, one of a first paper supplying port, a second paper supplying port, and a source indicated by a paper supply switching button provided on a printer, which sets paper to be supplied from either the first paper supplying port or the second paper supplying port;
   an output unit that designates, using the printer driver, print data including information indicating an item designated on the menu and outputs the print data to the printer as a print job;
   a determination unit that determines whether or not the print job to be outputted by said output unit is a job to be printed on a paper supplied from the paper supply source according to the paper supply switching button provided on the printer; and
   a display unit that displays, when the out-of-paper state occurs in the printer, (i) information which indicates lack of paper, a prompt to replenish the paper to resume the printing of the print job, and a button indicating how to switch a paper supply method, if said determination unit determines that the print job outputted by said output unit is a job to be printed on the paper supplied from the paper supply source according to the paper supplying switching button provided on the printer, or (ii) information which indicates lack of paper and a prompt to replenish paper to resume the printing of the print job without displaying the button indicating how to switch the paper supplying method, if said determination unit determines that the print job outputted by said output unit is not a job to be printed on the paper supplied from the paper supply source according to the paper supplying switching button provided on the printer,
   wherein when the button indicating how to switch the paper supplying method is designated by a user, said display unit displays information indicating that printing of the print job can resume by switching from the first paper supplying port to the second paper supplying port or switching from the second paper supplying port to the first paper supplying port.

8. The computer readable recording medium according to claim 7,
   wherein the first paper supplying port includes a manual paper supplying port and the second paper supplying port includes a paper supplying cassette.

9. The computer readable recording medium according to claim 8, further comprising a second determination unit that, when the out-of-paper state occurs in the printer, determines whether the out-of-paper state occurs in the paper supplying cassette of the printer,
   wherein said display unit displays, if said determination unit determines that the paper supply switching button is selected when the out-of-paper state occurs in the printer and said second determination unit determines that the out-of-paper state occurs in the paper supplying cassette of the printer, information which indicates lack of paper and that printing of the print job can resume by switching from the paper supplying cassette to the manual paper supplying port, and
   wherein said display unit displays, if said determination unit determines that the paper supply switching button is selected when the out-of-paper state occurs in the printer and said second determination unit determines that the out-of-paper state does not occur in the paper supplying cassette of the printer, information which indicates lack of paper and that printing of the print job can resume by switching from the manual paper supplying port to the paper supplying cassette.

* * * * *